US011425904B2

(12) United States Patent
Baur et al.

(10) Patent No.: US 11,425,904 B2
(45) Date of Patent: Aug. 30, 2022

(54) USE OF AQUEOUS DRIFT-REDUCING COMPOSITIONS

(71) Applicant: Clariant International Ltd., Muttenz (CH)

(72) Inventors: Peter Baur, Schondorf (DE); Martin Bauer, Frankfurt am Main (DE); Stephanie Giessler, Frankfurt am Main (DE); Siegfried Staiger, Frankfurt am Main (DE)

(73) Assignee: Clariant International Ltd., Muttenz (CH)

( * ) Notice: Subject to any disclaimer, the term of this patent is extended or adjusted under 35 U.S.C. 154(b) by 0 days.

(21) Appl. No.: 15/305,618

(22) PCT Filed: Apr. 23, 2015

(86) PCT No.: PCT/EP2015/000838
§ 371 (c)(1),
(2) Date: Oct. 20, 2016

(87) PCT Pub. No.: WO2015/161923
PCT Pub. Date: Oct. 29, 2015

(65) Prior Publication Data

US 2017/0042142 A1 Feb. 16, 2017

(30) Foreign Application Priority Data

Apr. 23, 2014 (DE) ............................ 102014005771

(51) Int. Cl.

| | |
|---|---|
| ***A01N 25/24*** | (2006.01) |
| ***A01N 25/30*** | (2006.01) |
| ***A01N 41/10*** | (2006.01) |
| ***A01N 57/20*** | (2006.01) |
| ***A01N 39/04*** | (2006.01) |
| ***A01N 37/40*** | (2006.01) |
| ***A01N 25/10*** | (2006.01) |
| ***A01N 25/32*** | (2006.01) |
| ***A01N 25/04*** | (2006.01) |

(52) U.S. Cl.
CPC ............. *A01N 25/24* (2013.01); *A01N 25/04* (2013.01); *A01N 25/10* (2013.01); *A01N 25/30* (2013.01); *A01N 25/32* (2013.01); *A01N 37/40* (2013.01); *A01N 39/04* (2013.01); *A01N 41/10* (2013.01); *A01N 57/20* (2013.01)

(58) Field of Classification Search
CPC ........ A01N 25/10; A01N 37/40; A01N 39/04; A01N 41/06; A01N 57/20
See application file for complete search history.

(56) References Cited

U.S. PATENT DOCUMENTS

| | | | |
|---|---|---|---|
| 2,016,962 | A | 10/1935 | Flint |
| 2,667,478 | A | 1/1954 | Schwartz |
| 2,703,798 | A | 3/1955 | Schwartz |
| 2,891,052 | A | 6/1959 | Boettner |
| 2,982,737 | A | 5/1961 | Boettner |
| 2,993,887 | A | 7/1961 | Zech |
| 3,002,923 | A | 10/1961 | Barker |
| 3,272,795 | A | 9/1966 | Basil |
| 4,079,078 | A | 3/1978 | Collins |
| 4,341,559 | A | 7/1982 | Friedemann |
| 4,400,196 | A | 8/1983 | Albrecht |
| 4,413,087 | A | 11/1983 | Bernot |
| 4,481,186 | A | 11/1984 | Deckner |
| 4,505,827 | A | 3/1985 | Rose |
| 4,565,647 | A | 1/1986 | Llenado |
| 4,654,207 | A | 3/1987 | Preston |
| 4,681,946 | A | 7/1987 | Baur |
| 4,981,684 | A | 1/1991 | MacKenzie |
| 5,009,814 | A | 4/1991 | Kelkenberg |
| 5,194,639 | A | 3/1993 | Connor |
| 5,254,281 | A | 10/1993 | Pichardo |
| 5,298,195 | A | 3/1994 | Brumbaugh |
| 5,317,047 | A | 5/1994 | Sabate |
| 5,354,425 | A | 10/1994 | Mackey |
| 5,380,891 | A | 1/1995 | Connor |
| 5,449,770 | A | 9/1995 | Shumate |
| 5,454,982 | A | 10/1995 | Murch |
| 5,500,155 | A | 3/1996 | Weuthen |

(Continued)

FOREIGN PATENT DOCUMENTS

| | | |
|---|---|---|
| BR | 112015009806 | 7/2017 |
| CA | 2117007 | 9/1994 |

(Continued)

OTHER PUBLICATIONS

Bezard (Lipids 1971;6:630-634).
Dale et al. (J. Sci. Food. Agric. 1955;6:166-170) (Year: 1955).
English Translation of Cited Excerpts of CN103468382A, Dec. 25, 2013. 2 pages.
Friedrich Vogel: "Kosmetik aus der Sicht des Chemikers", Chemie in Unserer Zeit, No. 5, Jan. 1, 1986 (Jan. 1, 1986), pp. 156-164, XP055109030, DOI: 10.1002/ciuz.19860200504 p. 160.
Hardcopy of http://igf-bingen.de/Croda_produkte.pdf, Dec. 1, 2016. 3 pages.
International Preliminary Report on Patentability for PCT/EP2013/061044, dated Feb. 12, 2014. 7 pages.

(Continued)

*Primary Examiner* — Mina Haghighatian
(74) *Attorney, Agent, or Firm* — Tod A. Waldrop

(57) ABSTRACT

The invention relates to the use of compositions which contain A) one or more copolymers, said copolymers containing one or more structural units resulting from a) 19.9 to 75.9 wt.-% of glycerin, b) 0.1 to 30 wt.-% of at least one dicarboxylic acid, and c) 24 to 80 wt.-% of at least one monocarboxylic acid according to formula (I): $R^1$—COOH, wherein $R^1$ is ($C_5$-$C_{29}$) alkyl; ($C_7$-$C_{29}$) alkenyl; phenyl or naphthyl, and B) water for reducing drift during the application of a spray emulsion that contains one or more pesticides.

21 Claims, No Drawings

(56) References Cited

U.S. PATENT DOCUMENTS 5,510,049 A 4/1996 Connor
5,539,134 A 7/1996 Strecker
5,559,078 A 9/1996 Garst
5,560,873 A 10/1996 Chen
5,625,098 A 4/1997 Kao
5,691,299 A 11/1997 Fabry
5,711,899 A 1/1998 Kawa
5,712,235 A 1/1998 Nieendick
5,716,922 A 2/1998 Curry
5,725,470 A 3/1998 Lazarowitz
5,750,748 A 5/1998 Boutique
5,766,267 A 6/1998 Schumacher
5,777,165 A 7/1998 Kao
5,789,372 A 8/1998 Fabry
5,874,096 A 2/1999 Hazen
5,945,389 A 8/1999 Richard
6,147,045 A 11/2000 Lappas
6,147,124 A 11/2000 Ansmann
6,165,955 A 12/2000 Chen
6,264,961 B1 7/2001 Ansmann
6,274,126 B1 8/2001 Newell
6,288,023 B1 9/2001 Honda
6,329,331 B1 12/2001 Aronson
6,350,788 B1 2/2002 Herold
6,391,962 B2 * 5/2002 Zerrer .................... A01N 25/10 424/405
6,455,001 B1 9/2002 Knappe
6,635,708 B1 10/2003 Papenfuhs
6,727,217 B1 4/2004 Nieendick
6,887,838 B2 5/2005 Dykstra
6,903,057 B1 6/2005 Tsaur
7,056,379 B2 6/2006 Nieendick
7,217,752 B2 5/2007 Schmucker-Castner
7,250,392 B1 7/2007 Leonard
7,297,666 B2 11/2007 Kuepper
7,380,606 B2 6/2008 Pursley
7,407,667 B2 * 8/2008 Zerrer .................... A01N 25/30 424/405
7,578,995 B2 8/2009 Frantz
7,776,318 B2 8/2010 Bissey-Beugras
7,820,771 B2 10/2010 Lapra
7,872,036 B2 1/2011 Toriyabe
7,897,543 B2 3/2011 Bretschneider
7,998,911 B1 8/2011 Berger
8,084,452 B2 12/2011 Jeschke
8,178,481 B2 5/2012 Sans
8,220,564 B2 7/2012 Runquist
8,263,538 B2 9/2012 Tsaur
8,324,390 B2 12/2012 Fischer
8,404,855 B2 3/2013 Jeschke
8,536,340 B2 9/2013 Hamamoto
8,637,432 B2 1/2014 Baur
8,729,323 B2 5/2014 Kothandaraman
8,759,255 B2 * 6/2014 Wacker .................. A01N 25/10 504/206
8,809,547 B2 8/2014 Bretschneider
8,901,041 B2 12/2014 Frisch
9,187,407 B2 11/2015 Koshti
9,504,636 B2 11/2016 Klug
9,949,909 B2 4/2018 Klug
10,172,774 B2 1/2019 Klug
10,265,253 B2 4/2019 Klug
2001/0023298 A1 9/2001 Weinelt
2001/0056048 A1 12/2001 Bertolosso
2002/0004476 A1 1/2002 Pancheri
2002/0040662 A1 4/2002 Dietz
2002/0065198 A1 5/2002 Highsmith
2002/0168417 A1 11/2002 Blease
2003/0004929 A1 1/2003 James
2003/0049292 A1 3/2003 Turowski-Wanke
2003/0069153 A1 4/2003 Jordan
2003/0199403 A1 10/2003 Wells
2004/0086470 A1 5/2004 Nieendick
2004/0167046 A1 8/2004 Lukenbach
2005/0037926 A1 2/2005 Zerrer
2005/0037942 A1 2/2005 Otterson
2005/0084466 A1 4/2005 Mullay
2005/0172859 A1 8/2005 Nieendick
2005/0233935 A1 10/2005 Gunn
2005/0256033 A1 11/2005 Hayden
2006/0058205 A1 3/2006 Ainger
2006/0079414 A1 4/2006 Nieendick
2006/0089294 A1 4/2006 Depoot
2006/0100127 A1 5/2006 Meier
2006/0110415 A1 5/2006 Gupta
2006/0110432 A1 5/2006 Luu
2006/0135382 A1 6/2006 Molenda
2006/0142291 A1 6/2006 Beilfuss
2006/0166826 A1 * 7/2006 Zerrer .................... A01N 25/30 504/127
2006/0171979 A1 8/2006 Calvo
2007/0054820 A1 3/2007 Harichian
2007/0060489 A1 3/2007 Sun
2007/0110700 A1 5/2007 Wells
2007/0128144 A1 6/2007 Bonastre Gilabert
2007/0190004 A1 8/2007 Bockmuhl
2007/0197464 A1 8/2007 Groenhof
2007/0213226 A1 9/2007 Sieverding
2008/0057014 A1 3/2008 Masuda
2008/0317960 A1 12/2008 Pitt
2009/0023622 A1 1/2009 Leidreiter
2009/0042749 A1 2/2009 Meier
2009/0111847 A1 4/2009 Li
2009/0118152 A1 5/2009 Lam
2009/0124498 A1 5/2009 Von Deyn
2009/0253612 A1 10/2009 Mushock
2009/0257972 A1 10/2009 Dieker
2010/0051200 A1 3/2010 Mueller
2010/0285077 A1 11/2010 Lintner
2010/0326320 A1 12/2010 Swedo
2011/0002865 A1 1/2011 Fournial
2011/0146536 A1 6/2011 Tomlinson
2011/0150786 A1 6/2011 Desenne
2011/0152150 A1 6/2011 Bernard
2011/0177945 A1 * 7/2011 Klingelhoefer ........ A01N 25/30 504/100
2011/0251116 A1 10/2011 Aehle
2011/0263471 A1 10/2011 Barnhart
2012/0009127 A1 1/2012 Dasgupta
2012/0010113 A1 1/2012 Hee
2012/0070388 A1 3/2012 Man
2012/0073817 A1 3/2012 Van Zanten
2012/0094890 A1 4/2012 Anantaneni
2012/0172223 A1 * 7/2012 Wacker .................. A01N 25/10 504/206
2012/0244092 A1 9/2012 Moser
2013/0030197 A1 1/2013 Harichian
2013/0189212 A1 7/2013 Jawale
2013/0216491 A1 8/2013 Ogihara
2014/0096969 A1 4/2014 Ali
2014/0121285 A1 5/2014 Baur
2014/0135245 A1 5/2014 Annaheim
2014/0230841 A1 8/2014 Mathonneau
2014/0255330 A1 9/2014 Cron
2014/0303389 A1 10/2014 Crosby
2014/0335049 A1 11/2014 Morein
2015/0032003 A1 1/2015 Cho
2015/0125415 A1 5/2015 Klug
2015/0126424 A1 5/2015 Klug
2015/0126616 A1 5/2015 Klug
2015/0133560 A1 5/2015 Klug
2015/0140048 A1 5/2015 Klug
2015/0141466 A1 5/2015 Klug
2015/0141508 A1 5/2015 Klug
2015/0150767 A1 6/2015 Klug
2015/0164755 A1 6/2015 Klug
2015/0164756 A1 6/2015 Klug
2015/0252174 A1 9/2015 Ahrens
2015/0282478 A1 * 10/2015 Baur ...................... A01N 25/02 514/772.3
2015/0315520 A1 11/2015 Eppler
2015/0320037 A1 11/2015 Wacker
2015/0335550 A1 11/2015 Koshti
2016/0074310 A1 3/2016 Klug

(56) References Cited

U.S. PATENT DOCUMENTS

| | | | |
|---|---|---|---|
| 2016/0136072 | A1 | 5/2016 | Klug |
| 2016/0143828 | A1 | 5/2016 | Klug |
| 2016/0243014 | A1 | 8/2016 | Dahms |
| 2016/0272666 | A1 | 9/2016 | Klug |
| 2016/0361243 | A1 | 12/2016 | Klug |
| 2017/0000710 | A1 | 1/2017 | Klug |
| 2017/0002297 | A1 | 1/2017 | Klug |
| 2017/0044434 | A1 | 2/2017 | Baur |
| 2017/0055524 | A1 | 3/2017 | Baur |
| 2017/0071199 | A1 | 3/2017 | Baur |
| 2017/0101606 | A1 | 4/2017 | Klug |
| 2017/0218293 | A1 | 8/2017 | Klug |
| 2017/0226349 | A1 | 8/2017 | Kupfer |
| 2017/0265477 | A1 | 9/2017 | Baur |
| 2017/0292062 | A1 | 10/2017 | Wylde |
| 2017/0305838 | A1 | 10/2017 | Appel |
| 2018/0215879 | A1 | 8/2018 | Kupfer |
| 2018/0291208 | A1 | 10/2018 | Kupfer |
| 2019/0076344 | A1 | 3/2019 | Klug |

FOREIGN PATENT DOCUMENTS

| | | | |
|---|---|---|---|
| CA | 1333226 | | 11/1994 |
| CA | 2127644 | | 1/1995 |
| CN | 1061960 | | 6/1992 |
| CN | 1077489 | | 10/1993 |
| CN | 1078746 | | 11/1993 |
| CN | 1088258 | | 6/1994 |
| CN | 1140987 | | 1/1997 |
| CN | 1141653 | | 1/1997 |
| CN | 1155239 | | 7/1997 |
| CN | 1184417 | A | 6/1998 |
| CN | 1292641 | | 4/2001 |
| CN | 1296524 | | 5/2001 |
| CN | 1501772 | | 6/2004 |
| CN | 1518408 | | 8/2004 |
| CN | 1594518 | | 3/2005 |
| CN | 100528887 | C | 5/2006 |
| CN | 1997341 | | 7/2007 |
| CN | 101056959 | A | 10/2007 |
| CN | 102186340 | | 9/2011 |
| CN | 102595882 | | 7/2012 |
| CN | 103468362 | | 12/2013 |
| CN | 103468382 | | 12/2013 |
| CN | 104918490 | | 9/2015 |
| DE | 1956509 | | 5/1971 |
| DE | 2226872 | A1 | 12/1973 |
| DE | 4238211 | | 1/1994 |
| DE | 4235783 | | 4/1994 |
| DE | 4435383 | | 11/1995 |
| DE | 19507531 | | 9/1996 |
| DE | 19701127 | | 7/1998 |
| DE | 19808824 | | 10/1999 |
| DE | 19846429 | | 4/2000 |
| DE | 19916090 | | 10/2000 |
| DE | 10117993 | | 10/2002 |
| DE | 10130357 | | 1/2003 |
| DE | 102007034438 | | 1/2009 |
| DE | 202013011412 | | 1/2014 |
| DE | 202013011413 | | 1/2014 |
| DE | 102012021647 | | 5/2014 |
| DE | 202014008415 | U1 | 11/2014 |
| DE | 202014008418 | U1 | 11/2014 |
| DE | 202014008420 | U1 | 12/2014 |
| DE | 102014017368 | A1 | 5/2015 |
| EP | 0039860 | | 11/1981 |
| EP | 0048436 | | 3/1982 |
| EP | 0285768 | | 10/1988 |
| EP | 0285786 | | 10/1988 |
| EP | 0336151 | | 10/1989 |
| EP | 0378985 | | 7/1990 |
| EP | 0407874 | | 1/1991 |
| EP | 0412849 | A2 | 2/1991 |
| EP | 0539588 | | 5/1993 |
| EP | 0550637 | | 7/1993 |
| EP | 0572723 | | 12/1993 |
| EP | 0614881 | | 9/1994 |
| EP | 0633244 | | 1/1995 |
| EP | 0709449 | | 5/1996 |
| EP | 0745719 | | 12/1996 |
| EP | 0769548 | A1 | 4/1997 |
| EP | 0774503 | A1 | 5/1997 |
| EP | 0995994 | | 4/2000 |
| EP | 1043017 | | 10/2000 |
| EP | 1078978 | | 2/2001 |
| EP | 1093722 | | 4/2001 |
| EP | 1110944 | | 6/2001 |
| EP | 1177223 | | 2/2002 |
| EP | 1379129 | | 1/2004 |
| EP | 1422288 | | 5/2004 |
| EP | 1529832 | | 5/2005 |
| EP | 1676831 | | 7/2006 |
| EP | 1716842 | | 11/2006 |
| EP | 1869978 | A1 | 12/2007 |
| JP | S4810053 | B | 2/1973 |
| JP | S63270534 | | 11/1988 |
| JP | H06501731 | | 2/1994 |
| JP | H06501733 | | 2/1994 |
| JP | H06240599 | | 8/1994 |
| JP | H07507341 | | 8/1995 |
| JP | H0812993 | | 1/1996 |
| JP | H0848618 | | 2/1996 |
| JP | H09502476 | | 3/1997 |
| JP | H09506683 | | 6/1997 |
| JP | H09510956 | | 11/1997 |
| JP | H10501279 | | 2/1998 |
| JP | H10508043 | | 8/1998 |
| JP | H11505839 | | 5/1999 |
| JP | H11246890 | | 9/1999 |
| JP | H11512334 | | 10/1999 |
| JP | 2000512286 | | 9/2000 |
| JP | 2000297028 | | 10/2000 |
| JP | 2001501635 | | 2/2001 |
| JP | 2001131579 | | 5/2001 |
| JP | 2001247528 | | 9/2001 |
| JP | 2002542344 | A | 12/2002 |
| JP | 2006183030 | | 7/2006 |
| JP | 2006183039 | | 7/2006 |
| JP | 2007538023 | | 12/2007 |
| JP | 2008110953 | | 5/2008 |
| JP | 2010018586 | | 1/2010 |
| JP | 2010037252 | | 2/2010 |
| JP | 2013534232 | | 9/2013 |
| JP | 2014532815 | | 12/2014 |
| JP | 2015518026 | | 6/2015 |
| JP | 2017526776 | | 9/2017 |
| KR | 100862502 | B1 | 10/2008 |
| WO | 9205764 | A1 | 4/1992 |
| WO | 9206073 | | 4/1992 |
| WO | 9206154 | | 4/1992 |
| WO | 9206158 | A1 | 4/1992 |
| WO | 9206161 | A1 | 4/1992 |
| WO | 9206162 | A1 | 4/1992 |
| WO | 9318125 | | 9/1993 |
| WO | 9319149 | | 9/1993 |
| WO | 9410130 | | 5/1994 |
| WO | 9412608 | | 6/1994 |
| WO | 9412609 | | 6/1994 |
| WO | 9419941 | | 9/1994 |
| WO | 9516824 | | 6/1995 |
| WO | 9517880 | A1 | 7/1995 |
| WO | 9519415 | | 7/1995 |
| WO | 9523840 | | 9/1995 |
| WO | 9533033 | | 12/1995 |
| WO | 9533035 | | 12/1995 |
| WO | 9603974 | A1 | 2/1996 |
| WO | 9610386 | | 4/1996 |
| WO | 9614374 | | 5/1996 |
| WO | 9616540 | | 6/1996 |
| WO | 9616540 | A1 | 6/1996 |
| WO | 9628023 | | 9/1996 |
| WO | 9637589 | | 11/1996 |
| WO | 9637592 | | 11/1996 |
| WO | 9747284 | A1 | 12/1997 |

(56) References Cited

FOREIGN PATENT DOCUMENTS

| | | | |
|---|---|---|---|
| WO | 9800496 | A1 | 1/1998 |
| WO | 9841601 | | 9/1998 |
| WO | 9856496 | | 12/1998 |
| WO | 9951716 | | 10/1999 |
| WO | 0065014 | | 11/2000 |
| WO | 0137658 | | 5/2001 |
| WO | 0160877 | | 8/2001 |
| WO | 02089575 | | 11/2002 |
| WO | 2002096882 | | 12/2002 |
| WO | 03000055 | | 1/2003 |
| WO | 2003106457 | | 12/2003 |
| WO | 2004056358 | | 7/2004 |
| WO | 2004099150 | | 11/2004 |
| WO | 2004099160 | | 11/2004 |
| WO | 2005035486 | | 4/2005 |
| WO | 2005063094 | | 7/2005 |
| WO | 2005077934 | | 8/2005 |
| WO | 2005117580 | | 12/2005 |
| WO | 2006043635 | | 4/2006 |
| WO | 2006056433 | | 6/2006 |
| WO | 2006089633 | | 8/2006 |
| WO | 2006100288 | | 9/2006 |
| WO | 2007040280 | | 4/2007 |
| WO | 2007057407 | | 5/2007 |
| WO | 2007075459 | | 7/2007 |
| WO | 2007101369 | | 9/2007 |
| WO | 2007115643 | | 10/2007 |
| WO | 2007115644 | | 10/2007 |
| WO | 2007115646 | | 10/2007 |
| WO | 2007141066 | A1 | 12/2007 |
| WO | 2007147500 | | 12/2007 |
| WO | 2007149134 | | 12/2007 |
| WO | 2005085216 | | 1/2008 |
| WO | 2008009360 | | 1/2008 |
| WO | 2008066153 | | 6/2008 |
| WO | 2008067911 | | 6/2008 |
| WO | 2008104503 | | 9/2008 |
| WO | 2009002956 | | 12/2008 |
| WO | 2009029561 | | 3/2009 |
| WO | 2009049851 | | 4/2009 |
| WO | 2009158478 | | 12/2009 |
| WO | 2010005692 | | 1/2010 |
| WO | 2010006713 | | 1/2010 |
| WO | 2010069502 | | 6/2010 |
| WO | 2010074747 | | 7/2010 |
| WO | 2010074751 | | 7/2010 |
| WO | 2010126657 | | 11/2010 |
| WO | 2010138661 | | 12/2010 |
| WO | 2011138450 | A2 | 11/2011 |
| WO | 2012061991 | | 5/2012 |
| WO | 2012116939 | | 9/2012 |
| WO | 2013016270 | A1 | 1/2013 |
| WO | 2013178668 | | 12/2013 |
| WO | 2013178670 | | 12/2013 |
| WO | 2013178670 | A2 | 12/2013 |
| WO | 2013178671 | | 12/2013 |
| WO | 2013178679 | | 12/2013 |
| WO | 2013178697 | | 12/2013 |
| WO | 2013178700 | | 12/2013 |
| WO | 2013178701 | | 12/2013 |
| WO | 2014056561 | A1 | 4/2014 |
| WO | 2014067663 | | 5/2014 |
| WO | 2014067663 | A1 | 5/2014 |
| WO | 2014170025 | | 10/2014 |
| WO | 2014206555 | A2 | 12/2014 |
| WO | 2015082062 | | 6/2015 |
| WO | 2015124302 | | 8/2015 |
| WO | 2016023693 | | 2/2016 |
| WO | 2016041823 | | 3/2016 |
| WO | 2016050782 | A1 | 4/2016 |

OTHER PUBLICATIONS

International Preliminary Report on Patentability for PCT/EP2014/001723, dated Jun. 8, 2015. 16 pages.

International Preliminary Report on Patentability for PCT/EP2015/000443, dated Jan. 22, 2016. 6 pages.

International Preliminary Report on Patentability for PCT/EP2015/076072, dated May 16, 2017. 5 pages.

International Search Report for PCT/EP2013/061044, dated May 15, 2014. 2 pages.

International Search Report for PCT/EP2013/061047, dated May 22, 2014. 3 pages.

International Search Report for PCT/EP2013/061075, dated May 15, 2014. 2 pages.

International Search Report for PCT/EP2013/061076, dated May 15, 2014. 2 pages.

International Search Report for PCT/EP2013/061100, dated Jul. 16, 2014. 4 pages.

International Search Report for PCT/EP2013/061100, dated Jul. 15, 2014. 4 pages.

International Search Report for PCT/EP2014/001723, dated Jan. 5, 2015. 3 pages.

International Search Report for PCT/EP2015/000443, dated Jun. 2, 2015. 2 pages.

International Search Report for PCT/EP2015/000871 dated Jul. 15, 2015. 3 pages.

International Search Report for PCT/EP2015/076072, dated Feb. 29, 2016. 2 pages.

Mohammadi et al. Langmuir vol. 20, pp. 9657-9662; publication year: 2004.

Palm fatty acid distillate (PFAD) [online] retrieved on May 21, 2018 from: https://www.neste.com/corporate-info/sustainability/sustainable-supply-chain/pfad-residue-palm-oil-refining-process; 1 page (Year: 2018).

Plante et al. Castor Oil [online] retrieved on Jan. 13, 2016 from: http://www.dionex.com/en-us/webdocs/110518-PO-UHPLC-Castor-Oil-31May2011-LPN2822-01.pdf; 5 pages.

PubChem, Methylmeglumine, 2006. (Year: 2006) 9 pages.

Quack, et al., Fette-Seifen-Anstrichmittel 78, 200(1976). 7 pages.

R. Mohammadi, J. Wassink, A. Amirfazli, "Effect of Surfactants on Wetting of Super-Hydrophobic Surfaces", Langmuir, American Chemical Society, (Oct. 1, 2004), vol. 20, No. 22, doi:10.1021/la049268k, ISSN 07437463, pp. 9657-9662, XP055098502.

Study on Synthesis and Properties of "Green" Surfactants—Glucamine derivates, Zhao Handong, Master Thesis, Southern Yangtze University, pp. 5-6, Jul. 25, 2007.

Tan et al. (Appl Microbiol Biotechnol. 1997;47:207-211) (Year: 1997).

The Chemistry of Coconut Oil, accessed online Jul. 12, 2018 (Year: 2018) 5 pages.

V. Bergeron, P. Cooper, C. Fischer. J. Giermanska-Kahn, D. Langevin, and A. Pouchelon, "Polydimethylsiloxane (PDMS)-based antifoams" Colloids and Surfaces A: Physicochemical and Engineering Aspects 122 (1997) 103 120. 18 pages.

Walter, A. ; Suchy, S.E. ; Vinson, P.K., "Solubility properties of the alkylmethylglucamide surfactants", Biochimica et Biophysica Acta (BBA)—Biomembranes, Elsevier, Amsterdam, NL, Amsterdam, NL, (Nov. 2, 1990), vol. 1029, No. 1, doi:10.1016/0005-2736(90)90437-S, ISSN 0005-2736, pp. 67-74, XP023354648.

Zhu, Y-P, et al., "Surface Properties of N-Alkanoyl-N-Methy Glucamines and Related Materials", J. of Surfactants and Detergents, vol. 2, No. 3, Jul. 1, 1999. 6 pages.

Lichtenthaler, F.W., "Carbohydrates as Organic Raw Materials," in Ullmann's Encyclopedia of Industrial Chemistry, Wiley-VCH Verlag, 2010. (34 pages).

Smith, J.T. et al., "Micellar Electrokinetic Capillary Chromatography with in Situ Charged Micelles. 1. Evaluation of N-D-Gluco-N-methylalkanamide Surfactants as Anionic Borate Complexes," Anal. Chem. 1994, 66, 1119-1133.

Söderlind, E. et al., "The usefulness of sugar surfactants as solubilizing agents in parenteral formulations," Elsevier, I nternational IJournal of Pharmaceutics 252 (2003) pp. 61-71, Aug. 19, 2002.

(56) References Cited

OTHER PUBLICATIONS

Tegeler, T. et al., Special Guest Editor Section: Electrically Driven Microseparation Methods for Pesticides and Metabolites: I. Micellar Electrokinetic Capillary Chromatography of Carbamate Insecticides with MEGA-Borate and SDS Surfactants, Journal of AOAC International, vol. 82, No. 6, pp. 1542-1549, Nov. 6, 1999.
International Search Report for PCT/EP2013/003290, dated Feb. 10, 2014. 5 pages.
"Product Specification: N-octanoyl-N-methylglucamine", Jun. 29, 2000 (Jun. 29, 2000), pp. 1-1, XP055098500, Retrieved from the Internet: URL:http://www.sigmaaldrich.com/Graphics/COfAInfo/SigmaSAPQM/SPEC/03/03129/03129-BULKSIGMA.pdf.
International Search Report for PCT/EP2014/001722, dated Jan. 5, 2015. 3 pages.
Synergen OS Innovation Spotlight, XP055203796, retrieved from the Internet: URL: http://clariant.de/C12575E4001FB2B8/vwLookuplmagesforLoad/CLA_InnoSpot_Synergen_EN_3.pdf/$FILE/CLA_InnoSpot_Synergen_EN_3.pdf (retrieved on Jul. 21, 2015) Sep. 1, 2013, 5 pages.
International Search Report for PCT/EP2015/072453, dated Oct. 23, 2015. 2 pages.
International Search Report for PCT/EP2016/063433, dated Aug. 24, 2016. 2 pages.
European Coatings Journal in 2009, vol. 07, pp. 26-28.
International Search Report for PCT/EP2016/071750, dated Jan. 28, 2017, 3 pages.
International Preliminary Report on Patentability for PCT/EP2016/071750, dated Apr. 10, 2018, 5 pages.
International Search Report for PCT/EP2016/074085, dated Jan. 3, 2017, 3 pages.
"Phase behavior studies of quaternary systems containing N-lauroyl-N-methylglucamide/alcohol/alkane/water", Yang et al., Journal of Colloid and Interface Science, Academic Press, New York, NY, US, vol. 320, No. 1, Feb. 19, 2008, pp. 283-289 (Year: 2008).
Anan Yaghmur et al., Langmuir, vol. 19, No. 4, pa 1063-1068, Feb. 1, 2003.
Bouton et al, Langmuir, vol. 26, No. 11, pp. 7962-7966, Jun. 1, 2010.
Eliana Areanas et al: Langmuir, vol. 12, No. 2, pp. 588-590, Jan. 1, 1996.
Gregory J. McFann et al., Langmuir, vol. 9, No. 11, pp. 2942-2948, Nov. 1, 1993.
Howard, et al., "Comparison of Flowback Aids: Understanding Their Capillary Pressure and Wetting Properties", SPE Paper 122307, 2009, 16 pages.
International Preliminary Report on Patentability for PCT/EP2015/070567, dated Dec. 23, 2016, 12 pages.
International Search Report for PCT/EP2015/070567, dated Mar. 22, 2016, 5 pages.
Panga, et al., "Wettability Alteration for Water-Block Prevention in High-Prevention in High-Temperature Gas Wells", SPE Paper 100182, 2006, 13 pages.
Penny, et al., "Field Studies of Drilling and Completion Fluids to Minimize Damage and Enhance Gas Production in Unconventional Reservoirs", SPE Paper 107844, 2007, 11 pages.
Pursley, et al., "Microemulsion Additive Enable Optimized Formation Damage Repairand Prevention" Paper 86556, 2004, SPE, 7 pages.
Quintero, et al., "Proper Design Criteria of Microemulsion Treatment fluids for Enhancing Well Production", SPE 144451, 2012, 10 pages.
Rickman, et al., "Optimizing Microemulsion/surfactant Packages for Shale and Tight-Gas Reservoirs", Paper 131107, 2010, SPE, 7 pages.
S. Ray et al., Langmuir, vol. 10, No. 8, pp. 2511-2515, Aug. 1, 1994.
S. Ezrahi et al., Journal of Colloid and Interface Science, vol. 191, No. 2, pp. 277-290, Jul. 1, 1997.
Harada, Shigeharu, and Hideko Sahara. "Volumetric behavior of micellization of acyl-N-methylglucamide surfactants in water." Langmuir 10.11 (1994): 4073-4076. (Year: 1994).
English abstract for WO 01/37658, May 31, 2001, 1 page.
International Preliminary Report on Patentability for App. No. PCT/EP2015/000838, dated Oct. 27, 2016, 8 pages.
The Pesticide Manual from the British Crop Protection Council, 16th Edition 2012, editor: C. MacBean, 2 pages.
International Preliminary Report on Patentability for App. No. PCT/EP2015/000370, dated Sep. 1, 2016, 12 pages.
International Search Report for App. No. PCT/EP2019/050825, dated Feb. 25, 2019, 4 pages.
"Compendium of Herbicide Adjuvants" (www.herbicide-adjuvants.com, 2014) PPP-115, WS-54, 76 pages.
Bayer CropScience, Material Safety Data Sheet, nonionic surfactants that are used in commercial formulations (e.g. Liberty®, from Bayer, EPA Reg. No. 264-829) 2011, 9 pages.
International Preliminary Report on Patentability for App. No. PCT/EP2017/059115, dated Apr. 16, 2018, 6 pages.
Teske et al., 2004, The Role of Small Droplets in Classifying Drop Size Distributions, ILASS Americas 17th Annual Conference, Arlington VA, 8 pages.
Vermeer et al., "The use of adjvanted formulations fordrift control", Proc. ISAA2013, pp. 323-329, 7 pages.
Google scholar_Oct. 14, 2021 glufosinate and alkyl ether sulfate (Year: 2021).

* cited by examiner

USE OF AQUEOUS DRIFT-REDUCING COMPOSITIONS

The invention relates to the use of compositions comprising certain copolymers and water for reducing drift on application of a spray liquor comprising one or more pesticides, and to a method for reducing drift on application of spray liquors comprising one or more pesticides.

Plant protection agents are applied to agricultural production fields in a very efficient manner employing spray tanks in aircraft, tractors or other devices. In order to achieve the most accurate placing possible of the active substances, it is necessary to obtain the narrowest possible spray cone and to avoid drifting of the spray mist out of the target location.

The drift of the spray cone is substantially determined by the droplet size distribution. The smaller the droplets, the longer the dwell time in the air and the greater the tendency to evaporate and/or to drift horizontally and to miss the target location. It is known from the literature that the fine drop content of <150 μm (Teske et al., 2004, The Role of Small Droplets in Classifying Drop Size Distributions, ILASS Americas 17th Annual Conference, Arlington Va.), in particular <100 μm (Vermeer et al., Proc. ISAA 2013, The use of adjvanted formulations for drift control), determines the content of the droplets in the spray cone which contributes towards the drift effect. Reduction of the fine drop content in the spray mist is therefore decisive for reducing drift and is therefore used to determine the drift properties of a composition.

A significant minimizing of the drift effect can be achieved by addition of suitable "drift control agents" to pesticide formulations, these having the effect of increasing the size of the droplets in the spray mist. The formulations modified with "drift control agents" must moreover be insensitive to the shear forces to which they are exposed in spray pumps and nozzles. Good biodegradability, compatibility with other constituents of the plant protection compositions and a high storage stability and temperature stability are further requirements of "drift control agents". It is known that the rheology of aqueous compositions can be modified by addition of water-soluble polymers, for example polyacrylamides, acrylamide/acrylic acid polymers, sodium polyacrylate, carboxymethylcellulose, hydroxyethylcellulose, methylcellulose, polysaccharides, natural and synthetic guar gum (U.S. Pat. Nos. 4,413,087, 4,505,827, 5,874,096).

Polymers of acrylamido-2-methylpropanesulfonic acid and acrylamide and the use thereof as drift-reducing adjuvants are known from WO 2001/060877.

Although good results are already achieved with the known systems, for technical, economic and ecological reasons efforts are continuing to be made to discover suitable "drift control agents" which also effectively increase the size of the droplet volumes of the aqueous compositions under conditions in practice and reduce drifting of the spray cone.

It has now been found, surprisingly, that compositions comprising A) certain copolymers based on polyglycerol and B) water are suitable as drift-reducing compositions for plant protection agents and during spraying of plant protection agents comprising such compositions have the effect of increasing the size of the particles and reducing the spray cone.

The invention therefore provides the use of compositions comprising

A) one or more copolymers, wherein the copolymers comprise one or more structural units originating from
   a) 19.9 to 75.9 wt. % of glycerol
   b) 0.1 to 30 wt. % of at least one dicarboxylic acid and
   c) 24 to 80 wt. % of at least one monocarboxylic acid according to formula (I)

$$R'\text{—}COOH \qquad (I)$$

wherein $R^1$ represents ($C_5$-$C_{29}$)-alkyl; ($C_7$-$C_{29}$)-alkenyl; phenyl or naphthyl, and B) Water for reducing drift on application of a spray liquor comprising one or more pesticides.

In the context of the present invention the compositions used according to the invention comprising the one or more copolymers of component A) and water of component B) are called "drift-reducing composition" or "drift-reducing compositions" in the following.

"Drift" in the context of the invention is understood as meaning the effect that during spraying of the plant protection agent small droplets form which can be carried beyond the area to be treated and in this way can make the spraying less effective or even harmful to adjacent areas and crops.

In the context of the present invention drift reduction is understood as meaning preferably the reduction in the content of the fine drops having a diameter of <105 μm in the spray mist compared with application of an agent which does not comprise the drift-reducing composition, preferably by at least 10% and particularly preferably by at least 25%.

In the context of the invention "application" of a spray liquor comprising one or more pesticides is understood as meaning the application of an aqueous spray liquor comprising one or more pesticides to the plants to be treated or the location thereof.

Preferably, the drift-reducing compositions comprise water in an amount of greater than 1.0 wt. %, particularly preferably greater than or equal to 2 wt. %, especially preferably greater than or equal to 5 wt. % and exceptionally preferably greater than or equal to 10 wt. %, in each case based on the total weight of the drift-reducing composition.

In copolymer component A) the contents mentioned for monomers a), b) and c) (in wt. %) relate to the total amount of the monomers such as have been employed for the preparation of the copolymers. They do not relate to the final composition of the copolymers, which deviates slightly from this due to the splitting of water liberated during the condensation.

The compositions of the copolymers which are possible in principle, and the preparation and embodiments of the copolymerization are described in EP 1 379 129. They all have in common that the condensation reactions proceed between alcohols and/or carboxylic acids, i.e. the monomers are bonded to one another by ether bonds (in the case of the condensation of two alcohol functions of the glycerol) or by ester bonds (in the case of condensation of one alcohol function of the glycerol with a carboxylic acid function of the mono- or dicarboxylic acid).

The copolymers A) are preferably prepared by first subjecting monoglycerol to a condensation reaction to give an oligo- or polyglycerol and only then reacting the product with the at least one dicarboxylic acid b) and the at least one monocarboxylic acid c). This has the effect that in this preferred embodiment of the invention the copolymers A) comprise condensed oligo- or polyglycerol units.

The at least one dicarboxylic acid b) is preferably oxalic acid, a dicarboxylic acid according to formula (II)

$$HOOC\text{—}R^2\text{—}COOH \qquad (II)$$

and/or a dicarboxylic acid according to formula (III)

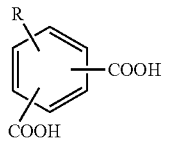

(III)

wherein $R^2$ represents a ($C_1$-$C_{40}$)-alkylene bridge, a ($C_2$-$C_{20}$)-alkenylene bridge or a mono- or dihydroxy-substituted ($C_2$-$C_{20}$)-alkylene bridge and R represents H, ($C_1$-$C_{20}$)-alkyl, ($C_2$-$C_{20}$)-alkenyl, phenyl, benzyl, halogen, —$NO_2$, ($C_1$-$C_6$)-alkoxy, —CHO or —CO(($C_1$-$C_6$)-alkyl).

Particularly preferably, the at least one dicarboxylic acid b) is phthalic acid, itaconic acid, tartaric acid, succinic acid, malic acid and/or adipic acid.

The at least one monocarboxylic acid c) is preferably one or more fatty acids having 8 to 24, preferably 12 to 22, carbon atoms, particularly preferably one or more saturated and/or unsaturated fatty acids selected from the group consisting of caprylic acid, capric acid, lauric acid, myristic acid, palmitic acid, stearic acid, archaic acid, behenic acid, palmitoleic acid, oleic acid, linoleic acid and mixtures of such fatty acids, such as e.g. tallow fatty acids and coconut fatty acids.

Particularly preferably, the at least one dicarboxylic acid b) is phthalic acid and the at least one monocarboxylic acid c) is a coconut fatty acid.

Especially preferably, the copolymers A) are based on 34.0 to 62.0 wt. % of glycerol, 0.2 to 21.0 wt. % of phthalic acid and 24.0 to 54.0 wt. % of coconut fatty acid.

The average degree of condensation of glycerol in the one or more copolymers of component A) is preferably between 4 and 10.

Copolymers 1 to 7 listed in the examples part are especially preferred.

Preferably, the one or more copolymers A) consists or consist of components a), b) and c).

The majority of the raw materials which are required for the preparation of the copolymers originate from regenerable raw material sources. Glycerol is currently a by-product of biodiesel production and the monocarboxylic acids are obtained from animal or plant fats or oils. Only the dicarboxylic acid is conventionally of synthetic origin.

In a preferred embodiment of the invention the content of the one or more copolymers of component A) in the drift-reducing compositions is preferably 1 to 90 wt. %, particularly preferably 10 to 80 wt. % and especially preferably 20 to 70 wt. % and the content of component B) is preferably 10 to 99 wt. %, particularly preferably 20 to 90 wt. % and especially preferably 30 to 80 wt. %, in each case based on the total weight of the drift-reducing compositions.

In addition to the one or more copolymers of component A) and water B), the drift-reducing compositions can comprise one or more auxiliary substances and additives.

In a preferred embodiment of the invention the drift-reducing compositions therefore comprise one or more auxiliary substances and additives (component C)).

The one or more auxiliary substances and additives can assume various functions in the drift-reducing compositions.

In a particularly preferred embodiment of the invention the drift-reducing compositions comprise one or more auxiliary substances and additives, wherein these are selected from the group consisting of adjuvants, cosolvents, emulsifiers, defoamers, urea, preservatives, solubilizing agents, wetting agents, penetration promoters, salts and surfactants and are preferably selected from the group consisting of adjuvants, cosolvents, defoamers, urea, preservatives, salts and surfactants.

In an especially preferred embodiment of the invention the drift-reducing compositions comprise one or more auxiliary substances and additives, wherein these are selected from the group consisting of adjuvants, defoamers, preservatives and surfactants.

In a further especially preferred embodiment of the invention the drift-reducing compositions comprise one or more auxiliary substances and additives, wherein these are selected from the group consisting of adjuvants, cosolvents and salts, preferably selected from the group consisting of adjuvants and cosolvents and particularly preferably selected from adjuvants.

In a further especially preferred embodiment of the invention the drift-reducing compositions comprise one or more auxiliary substances and additives, wherein these are selected from the group consisting of urea and salts (such as, for example, agrochemical salts) and preferably are selected from salts.

The adjuvants optionally contained in the drift-reducing compositions can be a single adjuvant or a mixture of two or more adjuvants. Examples of adjuvants are fatty amine ethoxylates, ether-amine ethoxylates, alkylbetaines, amidoalkylbetaines, amine oxides, amidoalkylamine oxides, phosphoric acid ester derivatives, alkyl polyglycosides and/or alkylglucamides. Such adjuvants are described, for example, in WO 2009/029561.

The cosolvents optionally contained in the drift-reducing compositions can be a single solvent or a mixture of two or more solvents. All the polar solvents which are compatible with the drift-reducing compositions and form a homogeneous phase, and in particular also in the case where the drift-reducing compositions are to comprise one or more pesticides, are suitable for this. Suitable cosolvents are, for example, monohydric alcohols, such as methanol, ethanol, propanols, butanols, benzyl alcohol, or polyhydric alcohols, such as ethylene glycol, diethylene glycol, propylene glycol, dipropylene glycol or glycerol, or polyglycols, such as polyethylene glycol, polypropylene glycol or mixed polyalkylene glycols (PAGs). Further suitable solvents are ethers, such as, for example, propylene glycol monomethyl ether, propylene glycol dimethyl ether, dipropylene glycol monomethyl ether or dipropylene glycol dimethyl ether, or amides, such as, for example, N-methylpyrrolidone, N-ethylpyrrolidone, lactic acid dimethylamide, caprylic acid dimethylamide or decanoic acid dimethylamide.

Particularly suitable cosolvents are mono- or polyhydric alcohols, and di- or trihydric alcohols are especially suitable, such as propylene glycol, dipropylene glycol, glycerol or polyethylene glycol, polypropylene glycol or mixed polyalkylene glycols (PAGs).

The defoamers optionally contained in the drift-reducing compositions can be a single defoamer or a mixture of two or more defoamers. Suitable defoamers are fatty acid alkyl ester alkoxylates, organopolysiloxanes, such as polydimethylsiloxanes and mixtures thereof with microfine, optionally silanized silica, perfluoroalkyl phosphonates, perfluoroalkyl phosphinates, paraffins, waxes and microcrystalline waxes and mixtures thereof with silanized silica. Mixtures of various foam inhibitors, for example those of silicone oil, paraffin oil and/or waxes, are also advantageous.

The preservatives optionally contained in the drift-reducing compositions can be a single preservative or a mixture of two or more preservatives. Preservatives which can be employed are organic acids and their esters, for example ascorbic acid, ascorbic palmitate, sorbate, benzoic acid, methyl 4-hydroxybenzoate, propyl 4-hydroxybenzoate, propionates, phenol, 2-phenyl phenate, 1,2-benzisothiazolin-3-one, formaldehyde, sulfurous acid and salts thereof.

The salts optionally contained in the drift-reducing compositions can be a single salt or a mixture of two or more salts. Preferably, the salts are agrochemical salts, particularly preferably one or more ammonium salts. Among the ammonium salts, ammonium sulfate, ammonium nitrate, ammonium phosphate, ammonium thiocyanate and/or ammonium chloride are in turn preferred.

The surfactants optionally contained in the drift-reducing compositions can be a single surfactant or a mixture of two or more surfactants. The surfactants can generally be all the nonionic, amphoteric, cationic or anionic surfactants which are compatible with the drift-reducing composition, and in particular also in the case where the drift-reducing compositions are to comprise one or more pesticides.

Examples of nonionic surfactants are EO/PO block copolymers (EO: ethylenoxy unit; PO: propylenoxy unit), alkoxylates, such as, for example, ethoxylates of longer-chain aliphatic alcohols (e.g. alkoxylates and specifically ethoxylates of linear or branched $C_8$ to $C_{24}$-alcohols) or of aromatic alcohols (e.g. alkylphenol alkoxylates, such as, for example, alkylphenol ethoxylates, tristyrylphenol alkoxylates, such as, for example, tristyrylphenol ethoxylates, and tri-sec-butylphenol ethoxylates), castor oil ethoxylates, esters of long-chain carboxylic acids with mono- or polyhydric alcohols and ethoxylation products thereof, optionally ethoxylates sorbitan esters, alkyl polyglycosides, fatty amine ethoxylates, longer-chain ether-amine alkoxylates and glucamides. Suitable amphoteric surfactants are, for example, long-chain alkyldimethylbetaines, alkyldimethylamine oxides or alkyldimethylamine-amidopropylamine oxides. Among the anionic surfactants, for example, ether sulfates of ethoxylated fatty alcohols, reaction products of (optionally ethoxylated) long-chain alcohols with phosphoric acid derivatives, salts of dodecylbenzenesulfonic and sulfosuccinates are suitable. "Long-chain" is understood as meaning linear or branched hydrocarbon chains having at least 6 and at most 22 carbon atoms.

The auxiliary substances and additives, for example the cosolvents and/or the adjuvants, can additionally contribute towards stabilizing of the drift-reducing composition, in that, for example, these positively influence the low temperature or heat stability and the turbidity point or further use properties, such as the viscosity.

In the context of the use according to the invention the drift-reducing compositions, for example comprising one or more adjuvants, are also suitable e.g. in the application of spray liquors comprising one or more pesticides for improving the biological activity of herbicides, insecticides, fungicides, acaricides, bactericides, molluscicides, nematicides and rodenticides.

Preferably, the drift-reducing compositions comprise one or more auxiliary substances and additives of component C), wherein in the drift-reducing compositions the content of the one or more copolymers of component A) is preferably 1 to 89.9 wt. %, particularly preferably 2 to 60 wt. % and especially preferably 5 to 50 wt. %, the content of component B) is preferably 2 to 98.9 wt. %, particularly preferably 3 to 90 wt. % and especially preferably 5 to 80 wt. % and the content of the one or more auxiliary substances and additives of component C) is preferably 0.1 to 70 wt. %, particularly preferably 1 to 60 wt. % and especially preferably 5 to 50 wt. %.

These amounts data are in each case based on the total weight of the drift-reducing compositions.

In an embodiment of the invention which is in turn preferred among these the content of water (component B)) in the drift-reducing compositions just mentioned comprising one or more auxiliary substances and additives is 10 to 98.9 wt. %, preferably 20 to 90 wt. % and particularly preferably 30 to 80 wt. %.

In a further preferred embodiment of the invention the drift-reducing compositions comprise one or more pesticides and particularly preferably one or more water-soluble pesticides. These "drift-reducing compositions comprising one or more pesticides" are storage-stable. They likewise have drift-reducing properties on application in the form of spray liquors.

In the context of the present invention "pesticides" are understood as meaning acaricides, bactericides, fungicides, herbicides, insecticides, molluscicides, nematicides and rodenticides as well as phytohormones, such as plant growth regulators. Phytohormones control physiological reactions, such as growth, flowering rhythm, cell division and seed ripening. An overview of the most relevant pesticides is to be found, for example, in "The Pesticide Manual" of the British Crop Protection Council, 16th edition 2012, editor: C. MacBean. Reference is herewith expressly made to the active substances listed there. By reference, they are a constituent of this description.

The pesticides which can be contained in the drift-reducing compositions comprising one or more pesticides are preferably selected from the group consisting of fungicides, herbicides, insecticides and plant growth regulators. Herbicides are particularly preferred.

Water-soluble pesticides in the context of the invention are to be understood as meaning pesticides which have a solubility at room temperature (25° C.) of more than 50 g/l and preferably more than 100 g/l in water.

Preferably, the drift-reducing compositions comprise one or more water-soluble pesticides, wherein the one or more water-soluble pesticides are selected from the group consisting of water-soluble herbicides and particularly preferably are selected from the group consisting of the water-soluble acids and salts, preferably the water-soluble salts, of acifluorfen, aminopyralid, amitrol, asulam, benazolin, bentazone, bialaphos, bicyclopyrone, bispyribac, bromacil, bromoxynil, chloramben, clopyralid, 2,4-D, 2,4-DB, dicamba, dichlorprop, difenzoquat, diquat, endothal, fenoxaprop, flamprop, flumiclorac, fluoroglycofen, fomesafen, fosamine, glufosinate, glyphosate, imazameth, imazamethabenz, imazamox, imazapic, imazapyr, imazaquin, imazethapyr, MCPA, MCPB, mecoprop, octanoic acid, paraquat, pelargonic acid, picloram, quizalofop, 2,3,6-TBA and triclopyr.

The precise chemical composition and structure of all these compounds are known and can be researched on the internet under: http://www.alanwood.net/pesticides/index_cn_frame.html Particularly preferably, the one or more water-soluble pesticides contained in the drift-reducing compositions is or are selected from the group consisting of the water-soluble acids and salts, preferably the water-soluble salts, of bentazone, 2,4-D, dicamba, fomesafen, glufosinate, glyphosate, MCPA and paraquat and especially preferably selected from the water-soluble salts of dicamba.

The water-soluble salts of the one or more pesticides are in particular the alkali metal and ammonium salts, and among these the potassium, ammonium, dimethylammonium, isopropylammonium, diglycolammonium and the (2-hydroxyethyl)trimethylammonium salts are in turn preferred.

The water-soluble pesticides can also be a combination of two or more pesticides. Such combinations are of importance in particular if it is a matter of broadening the action spectrum of a composition comprising one or more pesticides or of better suppressing resistances to certain pesticides.

In a further embodiment of the invention the drift-reducing compositions therefore comprise at least two water-soluble pesticides.

Preferably, the at least two water-soluble pesticides are selected from the group consisting of the water-soluble acids and salts, preferably the water-soluble salts, of 2,4-D, dicamba, fomesafen, glufosinate and glyphosate.

Particularly preferred drift-reducing compositions in this context are those in which the at least two water-soluble pesticides are the combinations of water-soluble acids and/or salts, preferably of water-soluble salts, of the two herbicides a) glyphosate and 2,4-D or
b) glyphosate and dicamba or
c) glyphosate and fomesafen or
d) glyphosate and glufosinate or
e) 2,4-D and dicamba or
f) glufosinate and 2,4-D or
g) glufosinate and dicamba.

In a preferred embodiment of the invention the drift-reducing compositions comprise one or more pesticides, particularly preferably one or more water-soluble pesticides, and one or more safeners. The safeners are preferably dispersed in these compositions. The one or more safeners are preferably selected from the group consisting of cloquintocet-mexyl, cyprosulfamide, isoxafenethyl and mefenpyr-diethyl.

Pesticides are conventionally employed in agriculture in the form of liquid or solid concentrated preparations (formulations). These make handling easier for the user in this way or ensure a higher activity of the active substance. The formulations are conventionally diluted with water before use and then applied by spray application. The amount applied during spray application is preferably 10-500 l/ha and particularly preferably 50-150 I/ha.

One important form of pesticide preparations are water-soluble concentrates (soluble liquids, abbreviated to SL). They play a major role in particular in the case of herbicides, wherein these are, for example, 2,4-D, dicamba, glufosinate and/or glyphosate, and which are often employed as water-soluble salts which are converted into their alkali metal or ammonium salts by neutralization of the acid form of these herbicides with suitable bases.

In a preferred embodiment of the invention the drift-reducing compositions comprising one or more pesticides are present in the form of soluble liquids.

When formulating aqueous pesticide compositions efforts are made to load the composition with the highest possible concentration of active substance. This reduces packaging, transportation, storage and disposal costs. An adjuvant composition should therefore be capable of rendering possible stable highly loaded pesticide compositions, so-called "high-load formulations". This is achieved surprisingly well with the drift-reducing compositions.

In a preferred embodiment of the invention the drift-reducing compositions comprise one or more water-soluble pesticides and the total amount of the one or more water-soluble pesticides in the drift-reducing compositions is greater than 100 g/l, preferably greater than 200 g/l, particularly preferably greater than 300 g/l and especially preferably greater than 400 g/l. These amounts data relate to the total volume of the drift-reducing compositions.

In a further preferred embodiment of the invention the total amount of the one or more copolymers of component A) in the drift-reducing compositions is from 10 to 250 g/l, preferably from 40 to 200 g/l and particularly preferably from 50 to 150 g/l. These amounts data relate to the total volume of the drift-reducing compositions, and preferably the drift-reducing compositions comprising one or more pesticides.

A particularly important criterion for the storage stability of aqueous pesticide compositions, such as, for example, 2,4-D, dicamba, glufosinate and/or glyphosate formulations, is the phase stability. A composition is regarded as sufficiently phase-stable if it remains homogeneous over a wide temperature range and if formation of two or more separate phases or precipitation (formation of a further solid phase) does not occur. Phase stability both at elevated temperature, such as can occur, for example, during storage in the sun or in hot countries, and at low temperature, such as, for example, in winter or in cold climatic regions, is the decisive prerequisite for a storage-stable formulation.

As already indicated above, soluble liquids (SL formulations) are an important form of pesticide preparations.

An important criterion for the storage stability of SL formulations is their phase stability. In this context the temperature range in which an SL formulation is phase-stable is important above all. The upper limit of the phase stability is the so-called turbidity point. This is the temperature up to which an aqueous formulation can be heated without phase separation. Until the turbidity point is reached SL formulations are present as clear homogeneous solutions. On heating to temperatures above the turbidity point the previously transparent formulation initially clouds, the components which are no longer soluble separate from the solution, and on leaving to stand phase separation occurs.

The turbidity point of a composition is typically determined by heating the solution until clouding occurs. Thereafter, the composition is allowed to cool, while stirring and constantly controlling the temperature. The temperature at which the clouded solution becomes clear again is documented as the measurement value of the turbidity point.

The lower limit of the phase stability is important above all during storage in the cold, such as, for example, in winter. Phase separation or precipitation or crystallization can also occur if the phase stability falls below the lower limit.

The drift-reducing compositions, preferably the drift-reducing compositions comprising one or more pesticides, are distinguished in that they are also phase-stable at a temperature of preferably greater than 55° C., particularly preferably of greater than 70° C. and especially preferably of greater than 80° C.

The drift-reducing compositions, preferably the drift-reducing compositions comprising one or more pesticides, are moreover distinguished in that they are also phase-stable at a temperature of preferably less than 10° C., particularly preferably of less than 0° C. and especially preferably of less than −10° C.

The one or more copolymers of component A) conventionally have no adverse influence on the phase stability of the drift-reducing compositions comprising one or more pesticides or on the turbidity point thereof, and the turbidity point of these compositions can be established to the desired extent, for example, by the choice of suitable additives of component C).

The pH of the drift-reducing compositions comprising one or more pesticides is preferably in the range of from 3.5 to 8.0, particularly preferably at 4.0 to 7.0 and especially preferably at 4.5 to 6.5 (measured as a 1 wt. % strength aqueous dilution). The pH is primarily determined by the pH values of the solutions of the aqueous pesticides, which are often present as salts of weak acids. By addition of acids or bases the pH can be adjusted to a different value deviating from the original pH of the mixture.

The high salt stability of the drift-reducing compositions comprising one or more pesticides in the aqueous medium also at a high pesticide and salt concentration is a major use advantage. It also renders it possible to accommodate agrochemical salts, such as, for example, fertilizers, simultaneously in the drift-reducing compositions.

In a further preferred embodiment of the invention the drift-reducing compositions comprising one or more pesticides, preferably one or more water-soluble pesticides, are present as concentrate formulations which are diluted before use, in particular with water (for example "ready-to-use" "in-can" or "built-in" formulations), and comprise the one or more pesticides in amounts of from 5 to 80 wt. %, preferably from 10 to 70 wt. % and particularly preferably from 20 to 60 wt. % and the one or more copolymers of component A) in amounts of from 1 to 25 wt. %, preferably from 2 to 20 wt. % and particularly preferably from 3 to 15 wt. %. These amounts data relate to the total weight of the concentrate formulation.

The drift-reducing compositions comprising one or more pesticides, preferably one or more water-soluble pesticides, can comprise one or more auxiliary substances and additives. In a preferred embodiment of the invention the drift-reducing compositions therefore comprise one or more pesticides, preferably one or more water-soluble pesticides, and one or more auxiliary substances and additives. These auxiliary substances and additives are the same auxiliary substances and additives which have already been described above under component C), and the same auxiliary substances and additives which are already described above as preferred under component C) are preferred.

The content of the one or more copolymers of component A) in the drift-reducing compositions comprising one or more pesticides, preferably one or more water-soluble pesticides, and particularly preferably in those furthermore comprising one or more auxiliary substances and additives, is preferably 0.1 to 40 wt. %, particularly preferably 0.5 to 30 wt. % and especially preferably 1 to 20 wt. %. These amounts data are based on the total weight of the drift-reducing compositions comprising one or more pesticides and preferably one or more water-soluble pesticides.

Furthermore, the content of the one or more pesticides in the drift-reducing compositions comprising one or more pesticides, preferably one or more water-soluble pesticides, and particularly preferably in those furthermore comprising one or more auxiliary substances and additives, is preferably 0.1 to 75 wt. %, particularly preferably 5 to 60 wt. % and especially preferably 10 to 50 wt. %. These amounts data are based on the total weight of the drift-reducing compositions comprising one or more pesticides and preferably one or more water-soluble pesticides.

In the drift-reducing compositions comprising one or more pesticides, preferably one or more water-soluble pesticides, and one or more auxiliary substances and additives the content of the one or more copolymers of component A) is preferably 0.1 to 40 wt. %, particularly preferably 0.5 to 30 wt. % and especially preferably 1 to 25 wt. %, the content of the one or more pesticides, preferably of the one or more water-soluble pesticides, is preferably 0.1 to 75 wt. %, particularly preferably 5 to 60 wt. % and especially preferably 10 to 50 wt. % and the content of the one or more auxiliary substances and additives is preferably 0.1 to 30 wt. %, particularly preferably 0.5 to 25 wt. % and especially preferably 1 to 20 wt. %.

These amounts data are based on the total weight of the drift-reducing compositions comprising one or more pesticides, and preferably one or more water-soluble pesticides.

In an embodiment of the invention which is in turn preferred among these the content of water in the drift-reducing compositions just mentioned comprising one or more pesticides and one or more auxiliary substances and additives is 2 to 98.9 wt. %, preferably 3 to 90 wt. % and particularly preferably 5 to 80 wt. %.

In a further embodiment of the invention which is in turn preferred among these the content of water in the drift-reducing compositions just mentioned comprising one or more pesticides and one or more auxiliary substances and additives is 10 to 98.9 wt. %, preferably 20 to 90 wt. % and particularly preferably 30 to 80 wt. %.

Pesticide preparations are preferably applied to the fields in the form of spray liquors. In the context of the present invention various procedures can be followed here. The spray liquors can be prepared, for example, by diluting concentrate formulations, in particular drift-reducing compositions comprising one or more pesticides, with a defined amount of water ("in-can method"). However, the spray liquors can also be prepared, for example, by combining a drift-reducing composition, preferably one which still comprises no pesticide, with at least one or more pesticides and water directly before application to the plants to be treated or the location thereof ("tank mix method").

In a further preferred embodiment of the invention the spray liquors comprise 0.01 to 10 wt. %, preferably 0.02 to 3 wt. % and particularly preferably 0.025 to 2 wt. % of the one or more pesticides, preferably of the one or more water-soluble pesticides, and 0.001 to 3 wt. %, preferably 0.005 to 1 wt. % and particularly preferably 0.01 to 0.5 wt. % of the one or more copolymers of component A). The amounts data stated in each case relate to the total weight of the spray liquor.

The one or more pesticides contained in the spray liquor are preferably those pesticides which have already been described above in connection with the "drift-reducing compositions comprising one or more pesticides".

The use according to the invention takes place in particular in the use of spray liquors comprising one or more pesticides for controlling and/or for combating weeds, fungal diseases or insect attack.

The one or more copolymers of component A) can fulfill several purposes in the drift-reducing compositions, preferably the drift-reducing compositions comprising one or more pesticides, and in the spray liquors comprising one or more pesticides. Due to their chemical structure, they can act above all as an emulsifier, wetting agent or dispersing agent.

The one or more copolymers of component A) can also contribute towards increasing the biological activity of the one or more pesticides, i.e. function as adjuvants. An adjuvant is understood as meaning auxiliary substances which increase the biological activity of the active substances without themselves displaying a biological action, for example by improving the wetting, the retention or the uptake into the plant or the target organism.

Depending on the type of formulation, preparation of the drift-reducing compositions and of the spray liquors is possible by various routes, which are adequately known to the person skilled in the art.

The invention also provides a method for reducing drift on application of a spray liquor comprising one or more pesticides by spraying on to the plants to be treated or the location thereof, wherein the spray liquor comprises a composition which is drift-reducing as described above.

The invention also provides a method for reducing drift on application of a spray liquor comprising one or more pesticides by spraying on to the plants to be treated or the location thereof, wherein the spray liquor has been prepared using a composition which is drift-reducing as described above.

The spray liquors employed in the method according to the invention preferably comprise 0.01 to 10 wt. %, particularly preferably 0.02 to 3 wt. % and especially preferably 0.025 to 2 wt. % of the one or more pesticides, preferably of the one or more water-soluble pesticides, and preferably 0.001 to 3 wt. %, particularly preferably 0.005 to 1 wt. % and especially preferably 0.01 to 0.5 wt. % of the one or more copolymers of component A), in each case based on the total weight of the spray liquors.

The preferred embodiments given for the use according to the invention are similarly preferred embodiments for the method according to the invention.

EXAMPLES

The invention is illustrated in the following with the aid of examples which, however, are in no way to be regarded as a limitation.

The percentage data stated in the following are percentage by weight (wt. %) unless explicitly stated otherwise.

The commercial products employed are:

Genamin® 267 amine ethoxylate from Clariant

Synergen® GA $C_8/C_{10}$ alkyl-N-methylglucamide from Clariant

Sterling Blue dicamba DGA herbicide formulation (480 g/l a.e.) from Winfield

DGA diglycolamine [2-(2-aminoethoxy)ethanol]

Glyphosate IPA salt isopropylammonium salt of glyphosate "a.e." denotes "acid equivalent"

Preparation Examples

A) General Instructions for the Preparation of Copolymers 1 to 7

The copolymers are prepared in two steps, wherein in the first step glycerol is subjected to a condensation reaction to give the corresponding polyglycerol, which is then reacted with monocarboxylic acid and dicarboxylic acid to give the copolymer.

Preparation of polyglycerol (n=9.7): 2,000 g of glycerol and 6.0 g of NaOH (50 wt. % strength in water) were heated to 270° C. in a stirred apparatus with a nitrogen inlet and water removal unit, while stirring. After a reaction time of 9 hours and a discharge of 444 g of water, a sample was taken and the OH number was determined. The OH number determined was 891 mg of KOH/g. This corresponds to an average degree of condensation n of 9.7 glycerol units.

Preparation of polyglycerol (n=5.0): 2,000 g of glycerol and 6.0 g of NaOH (50 wt. % strength in water) were heated to 270° C. in a stirred apparatus with a nitrogen inlet and water removal unit, while stirring. After a reaction time of 4 hours and a discharge of 226 g of water, a sample was taken and the OH number was determined. The OH number determined was 1,009 mg of KOH/g. This corresponds to an average degree of condensation n of 5.0 glycerol units.

The method described in DIN 53240 is used to determine the OH number.

Condensation of polyglycerol with mono- and dicarboxylic acid to give the copolymer: The polyglycerol was introduced into a stirred container with a line for passing $N_2$ through and a water removal unit and coconut fatty acid (Cana) and phthalic acid were added. The reaction mixture was then heated to 220° C., while stirring, until the copolymer has an acid number of <1.00 mg KOH/g (three to nine hours)

The method described in DIN EN ISO 2114 is used to determine the acid number.

The absolute amounts employed for the monomers for the preparation of copolymers 1-7 and the percentage by weight composition of copolymers 1-7 are given in Table 1.

The percentage by weight compositions of copolymers 1-7 stated in Table 1 relate to the total amount of the monomers such as were employed for the preparation of the copolymers. They do not relate to the final composition of the copolymers, which deviates from this due to the splitting of water liberated during the condensation.

TABLE 1

| Composition of the copolymer: | | | | | | | |
|---|---|---|---|---|---|---|---|
| Copolymer | Glycerol [g] | n | Phthalic acid [g] | Coconut fatty acid [g] | Glycerol content [wt. %] | Phthalic acid content [wt. %] | Coconut fatty acid content [wt. %] |
| 1 | 460 | 5.0 | 1.7 | 408 | 52.9 | 0.2 | 46.9 |
| 2 | 460 | 5.0 | 17 | 408 | 52.0 | 1.9 | 46.1 |
| 3 | 218 | 9.7 | 40.4 | 98.8 | 61.0 | 11.3 | 27.7 |
| 4 | 460 | 5.0 | 166 | 204 | 55.4 | 20.0 | 24.6 |
| 5 | 218 | 9.7 | 83 | 98.8 | 54.5 | 20.8 | 24.7 |
| 6 | 460 | 5.0 | 166 | 408 | 44.5 | 16.1 | 39.5 |
| 7 | 460 | 5.0 | 166 | 712 | 34.4 | 12.4 | 53.2 |

n: average degree of condensation of the glycerol

B) Examples of Drift-Reducing Compositions

Example DC1

70 wt. % of copolymer 3 are introduced into 30 wt. % of water, while stirring.

A clear, brown highly viscous solution forms.

Example DC2

45 wt. % of copolymer 3 and 10 wt. % of dipropylene glycol are introduced into 45 wt. % of water, while stirring. A clear, yellowish solution forms.

Example DC3

45 wt. % of copolymer 3, 45 wt. % of Synergen GA and 5 wt. % of propylene glycol are introduced into 5 wt. % of water, while stirring. A clear, yellowish solution forms.

Example DC4

30 wt. % of copolymer 3 and 30 wt. % of Genamin 267 are introduced into 40 wt. % of water, while stirring. A clear, yellowish solution forms.

C) Examples of Drift-Reducing Compositions Comprising Pesticide

Example PC1

Preparation of an Aqueous Pesticide Composition Based on Dicamba

A clear homogeneous aqueous composition was prepared by mixing 86 wt. % of an aqueous solution which comprises 480 g/l (a.e.) of dicamba DGA salt (corresponds to approx. 708 g/l of the dicamba salt) and 14 wt. % of DC1. The composition comprises 10 wt. % of copolymer 3. The composition was storage-stable for at least three months at temperatures of −10° C., 0° C., 25° C. and 50° C.

Example PC2

Preparation of an Aqueous Pesticide Composition Based on IPA Glyphosate

A clear homogeneous aqueous composition was prepared by mixing 68.4 wt. % of an aqueous solution which comprises 565 g/l (a.e.) of IPA glyphosate salt (corresponds to approx. 763 g/l of the glyphosate salt) and 14 wt. % of DC1 and 15 wt. % of Genamin 267, and was topped up to 100 wt. % with water.

The composition was storage-stable for at least three months at temperatures of −10° C., 0° C., 25° C. and 50° C.

Example PC3

Preparation of an Aqueous Pesticide Composition Based on IPA Glyphosate

A clear, homogeneous aqueous composition was prepared by mixing 68.4 wt. % of an aqueous solution which comprises 565 g/l (a.e.) of IPA glyphosate salt (corresponds to approx. 763 g/l of the glyphosate salt), and 14 wt. % of DC1 and 15 wt. % of Synergen GA, and was topped up to 100 wt. % with water.

The composition was storage-stable for at least three months at temperatures of −10° C., 0° C., 25° C. and 50° C.

Example PC4

Preparation of an Aqueous Pesticide Composition Based on Potassium Glyphosate

A clear, homogeneous aqueous composition was prepared by mixing 73.5 wt. % of an aqueous solution which comprises 680 g/l (a.e.) of potassium glyphosate salt (corresponds to approx. 833 g/l of the glyphosate salt), 14 wt. % of DC1 and 10 wt. % of Synergen GA, and was topped up to 100 wt. % with water.

The composition was storage-stable for at least three months at temperatures of −10° C., 0° C., 25° C. and 50° C.

D) Examples of Aqueous Spray Liquors

Examples of Spray Liquors with Dicamba

The composition of spray liquors A1-A6 is given in the following.

| Spray liquor | Dicamba DGA [g/l] | Copolymer 3 [g/l] |
|---|---|---|
| A1 | 3 | 0 |
| A2 | 3 | 0.1 |
| A3 | 3 | 0.25 |
| A4 | 3 | 0.5 |
| A5 | 3 | 1.0 |
| A6 | 3 | 1.5 |

These spray liquors are prepared by mixing aqueous SL formulations which comprise 480 g/l (a.e.) of dicamba DGA salt (e.g. Sterling Blue from Winfield), water or various concentrations of drift-reducing composition DC1 and water.

The spray liquors can also be obtained from pesticide compositions, for example similarly to Example PC1, by dilution with water.

Examples of Spray Liquors with IPA Glyphosate

The composition of spray liquors B1-B6 is given in the following.

| Spray liquor | IPA glyphosate [g/l] | Copolymer 3 [g/l] |
|---|---|---|
| B1 | 7 | 0 |
| B2 | 7 | 0.1 |
| B3 | 7 | 0.25 |
| B4 | 7 | 0.5 |
| B5 | 7 | 1.0 |
| B6 | 7 | 1.5 |

These spray liquors are prepared by mixing an aqueous SL formulation which comprises 565 g/l (a.e.) of IPA glyphosate salt, water or various concentrations of drift-reducing composition DC1 and water.

The composition of spray liquors $C_1$-$C_6$ is given in the following.

| Spray liquor | Potassium glyphosate [g/l] | Copolymer 3 [g/l] |
|---|---|---|
| C1 | 10 | 0 |
| C2 | 10 | 0.1 |
| C3 | 10 | 0.25 |
| C4 | 10 | 0.5 |
| C5 | 10 | 1.0 |
| C6 | 10 | 1.5 |

These spray liquors are prepared by mixing an aqueous SL formulation which comprises 680 g/l (a.e.) of potassium glyphosate salt, water or various concentrations of drift-reducing composition DC1 and water.

E) Use Examples

Measurement of the Drop Size Distribution

A Malvern Spraytec “real-time spray sizing system” was used to determine the drop size distribution. For this, the system (STP5321, Malvern Instruments GmbH, Heidelberg, Germany) was mounted in a spray booth of our own construction with the option of being able to select spray applications of conventional practice under a freely adjustable pressure for diverse hydraulic nozzles and freely adjustable distances (nozzle-target surface). The spray booth can be darkened and all interfering parameters can be eliminated. The injector nozzle ID12002 (Lechler) with relatively coarse drop sizes was used for the measurements. The pressure established was varied and an average pressure of 3 bar was kept constant for the measurements reported below. The temperature and relative atmospheric humidity varied between 21.5 and 29° C. and, respectively, 33% and 56%. In each test series tap water and a spray liquor with pesticide but without drift-reducing composition, as internal standards, were always measured. The Spraytec measurement was carried out at the setting of 1 kHz, since measurements at 2.5 kHz or higher, like other influencing variables such as additional suction, proved to be negligible. The measurement in the spray mist was kept constant at a position with distances of exactly 29.3 cm to the nozzle and 0.4 cm from the perpendicular under the nozzle. The measurements were carried out within 5 seconds and the mean of 6 repeats is reported as the volume content of the drops of diameter<90 μm ("vol 90"), <105 μm ("vol 105") and <150 μm ("vol 150") (percentage standard error 0.5-2.5%). As a further measurement parameter the volume content of drops of diameter <210 μm was determined ("vol 210") and related to the volume content of the drops of diameter <105 μm ("vol 210/vol 105"). The percentage reduction in the volume content of the drops of diameter <105 μm using the drift-reducing compositions compared with the use of the comparison compositions A1, B1 and C1 was furthermore calculated ("red 105").

Use Example 1

Drop size distribution injector nozzle (under 3 bar) using spray liquors A1-A6.

| Spray liquid | Vol 90 [vol. %] | Vol 105 [vol. %] | Vol 150 [vol. %] | Vol 210/ vol 150 | Nozzle | Red 105 [%] |
|---|---|---|---|---|---|---|
| Water | 2.56 | 3.92 | 8.31 | 3.63 | ID12002 | — |
| A1 (comparison) | 3.72 | 5.20 | 9.63 | 3.17 | ID12002 | — |
| A2 (invention) | 1.71 | 2.62 | 4.78 | 3.16 | ID12002 | 52 |
| A3 (invention) | 1.75 | 2.59 | 4.94 | 3.10 | ID12002 | 50 |
| A4 (invention) | 1.59 | 2.36 | 4.47 | 3.10 | ID12002 | 55 |
| A5 (invention) | 1.58 | 2.29 | 4.06 | 2.83 | ID12002 | 56 |
| A6 (invention) | 1.40 | 2.03 | 3.62 | 2.93 | ID12002 | 61 |

Use Example 2

Drop size distribution injector nozzle (under 3 bar) using spray liquors B1-B6.

| Spray liquid | Vol 90 [vol. %] | Vol 105 [vol. %] | Vol 150 [vol. %] | Vol 210/ vol 150 | Nozzle | Red 105 [%] |
|---|---|---|---|---|---|---|
| Water | 2.58 | 3.93 | 8.37 | 3.69 | ID12002 | — |
| B1 (comparison) | 2.20 | 3.33 | 6.96 | 3.63 | ID12002 | — |
| B2 (invention) | 1.66 | 2.44 | 4.52 | 3.01 | ID12002 | 27 |
| B3 (invention) | 1.55 | 2.28 | 4.19 | 2.94 | ID12002 | 31 |
| B4 (invention) | 1.44 | 2.09 | 3.69 | 2.82 | ID12002 | 37 |
| B5 (invention) | 1.30 | 1.87 | 3.22 | 2.86 | ID12002 | 44 |
| B6 (invention) | 1.21 | 1.75 | 3.04 | 2.94 | ID12002 | 47 |

Use Example 3

Drop size distribution injector nozzle (under 3 bar) using spray liquors $C_1$-$C_6$.

| Spray liquid | Vol 90 [vol. %] | Vol 105 [vol. %] | Vol 150 [vol. %] | Vol 210/ vol 150 | Nozzle | Red 105 [%] |
|---|---|---|---|---|---|---|
| Water | 2.53 | 3.88 | 8.26 | 3.66 | ID12002 | — |
| C1 (comparison) | 2.01 | 3.03 | 6.25 | 3.58 | ID12002 | — |
| C2 (invention) | 1.49 | 2.22 | 4.11 | 2.93 | ID12002 | 27 |
| C3 (invention) | 1.50 | 2.22 | 4.02 | 2.82 | ID12002 | 27 |
| C4 (invention) | 1.43 | 2.10 | 3.70 | 2.75 | ID12002 | 31 |
| C5 (invention) | 1.30 | 1.88 | 3.17 | 2.60 | ID12002 | 38 |
| C6 (invention) | 1.24 | 1.79 | 3.04 | 2.79 | ID12002 | 41 |

The invention claimed is:

1. A method for reducing drift on application of a spray liquor comprising at least one pesticide, comprising the step of including at least one drift reducing composition comprising A) at least one copolymer, wherein the copolymer is a copolymer of a) 19.9 to 75.9 wt. % of glycerol b) 0.1 to 30 wt. % of at least one dicarboxylic acid selected from the group consisting of oxalic acid, a dicarboxylic acid according to formula (II)

$$HOOC—R^2—COOH \quad (II)$$

and a dicarboxylic acid according to formula (III)

(III)

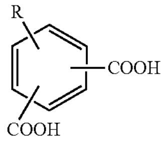

and mixtures thereof, wherein $R^2$ is a $(C_1-C_{40})$ alkylene bridge or a $(C_2-C_{20})$ alkylene bridge or a mono or dihydroxy-substituted $(C_2-C_{20})$-alkylene bridge and R represents H, a $(C_1-C_{20})$-alkyl, $(C_2-C_{20})$-alkenyl, phenyl, naphthyl, benzyl, halogen, —$NO_2$, ($C_1$-$C_6$)-alkoxy, —CHO, or —CO(($C_1$-$C_6$)-alkyl), and (c) 24 to 80 wt. % of at least one monocarboxylic acid according to formula (I)

$R^1$—COOH (I)

wherein $R^1$—COOH is a fatty acid having 8 to 24 carbon atoms, wherein the wt % are based on the total weight of the monomers a), b), and c) and B) water in the spray liquor comprising at least one pesticide.

2. The method for reducing drift on application of a spray liquor comprising at least one pesticide as claimed in claim 1, wherein the composition comprises water in an amount of greater than 1.0 wt. % and less than 99 wt. %, based on the total weight of the composition.

3. The method for reducing drift on application of a spray liquor comprising at least one pesticide as claimed in claim 1, wherein the at least one dicarboxylic acid b) is phthalic acid and the at least one monocarboxylic acid c) is a coconut fatty acid.

4. The method for reducing drift on application of a spray liquor comprising at least one pesticide as claimed in claim 1, wherein in the drift reducing composition the content of the at least one copolymer of component A) is 1 to 90 wt. %, and the content of component B) is 10 to 99 wt. % based on the total weight of the drift reducing composition.

5. The method for reducing drift on application of a spray liquor comprising at least one pesticide as claimed in claim 1, wherein the drift reducing composition further comprises at least one auxiliary substance or at least one additive or mixtures thereof (component C).

6. The method for reducing drift on application of a spray liquor comprising at least one pesticide as claimed in claim 5, wherein the content of the at least one copolymer of component A) is 1 to 89.9 wt. %, the content of component B) is 2 to 98.9 wt. %, and the content of component C) is 0.1 to 70 wt. %, in each case based on the total weight of the drift reducing composition.

7. The method for reducing drift on application of a spray liquor comprising at least one pesticide as claimed in claim 1, wherein the at least one pesticide is selected from the group consisting of water-soluble pesticides.

8. The method for reducing drift on application of a spray liquor comprising at least one pesticide as claimed in claim 7, wherein the spray liquor comprises at least two water-soluble pesticides.

9. The method for reducing drift on application of a spray liquor comprising at least one pesticide as claimed in claim 8, wherein the at least two water-soluble pesticides are selected from the group consisting of the water-soluble acids and salts thereof.

10. A method for reducing drift on application of a spray liquor comprising at least two pesticides comprising the step of including at least one drift reducing composition comprising A) at least one copolymer, wherein the copolymer is a copolymer of a) 19.9 to 75.9 wt. % of glycerol b) 0.1 to 30 wt. % of at least one dicarboxylic acid selected from the group consisting of oxalic acid, a dicarboxylic acid according to formula (II)

HOOC—$R^2$—COOH (II)

and a dicarboxylic acid according to formula (III)

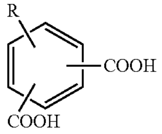

(III)

and mixtures thereof, wherein $R^2$ is a ($C_1$-$C_{40}$) alkylene bridge or a ($C_2$-$C_{20}$) alkylene bridge or a mono or dihydroxy-substituted ($C_2$-$C_{20}$)-alkylene bridge and R represents H, a ($C_1$-$C_{20}$)-alkyl, ($C_2$-$C_{20}$)-alkenyl, phenyl, naphthyl, benzyl, halogen, —$NO_2$, ($C_1$-$C_6$)-alkoxy, —CHO, or —CO(($C_1$-$C_6$)-alkyl), and (c) 24 to 80 wt. % of at least one monocarboxylic acid according to formula (I)

$R^1$—COOH (I)

wherein $R^1$—COOH is a fatty acid having 8 to 24 carbon atoms, wherein the wt % are based on the total weight of the monomers a), b), and c) and B) water in the spray liquor comprising at least two pesticides, wherein the at least two pesticides are a combination of water-soluble acids and/or salts, and wherein the combination is selected from the group consisting of a) glyophosphate and 2,4-D, b) glyophosphate and dicamba, c) glyophosphate and fomesafen, d) glyophosphate and glufosinate, e) 2,4-D and dicamba, f) glufosinate and 2,4-D, and g) glufosinate and dicamba.

11. The method for reducing drift on application of a spray liquor comprising at least one pesticide as claimed in claim 1, wherein the spray liquor includes at least one safener.

12. The method for reducing drift on application of a spray liquor comprising at least one pesticide as claimed in claim 1, wherein the total amount of the at least one copolymer of component A) in the drift reducing composition is from 10 to 50 g/l, based on the total volume of the spray liquor.

13. The method for reducing drift on application of a spray liquor comprising at least one pesticide as claimed in claim 5, wherein the content of the at least one copolymer of component A) is 0.1 to 40 wt. %, the content of the at least one pesticide, is 0.1 to 75 wt. %, and the content of the at least one auxiliary substance or additive is 0.1 to 30 wt. %, in each case based on the total weight of the composition.

14. The method for reducing drift on application of a spray liquor comprising at least one pesticide as claimed in claim 1, wherein the spray liquor comprises 0.01 to 10 wt. % of the at least one pesticide, and 0.001 to 3 wt. % of the at least one polymer of component A), in each case based on the total weight of the spray liquor.

15. The method for reducing drift on application of a spray liquor comprising at least one pesticide as claimed in claim 1, wherein $R^1$—COOH is a fatty acid having 12 to 22 carbon atoms.

16. The method for reducing drift on application of a spray liquor comprising at least one pesticide as claimed in claim 1, wherein the at least one dicarboxylic acid b) is phthalic acid.

17. The method for reducing drift on application of a spray liquor comprising at least one pesticide as claimed in claim 1, wherein the at least one dicarboxylic acid b) is phthalic acid, itaconic acid, tartaric acid, succinic acid, malic acid and/or adipic acid.

18. The method for reducing drift on application of a spray liquor comprising at least one pesticide as claimed in claim 1, wherein the at least one monocarboxylic acid c) is a coconut fatty acid.

19. The method for reducing drift on application of a spray liquor comprising at least one pesticide as claimed in claim 1, wherein the copolymer A) is a copolymer of 34.0 to 62.0 wt. % of glycerol, 0.2 to 21.0 wt. % of the at least one dicarboxylic acid, and 24.0 to 54.0 wt. % of the at least one monocarboxylic acid.

20. The method for reducing drift on application of a spray liquor comprising at least one pesticide as claimed in claim 17, wherein the at least one dicarboxylic acid is phthalic acid and the at least one monocarboxylic acid is coconut fatty acid.

21. The method for reducing drift on application of a spray liquor comprising at least one pesticide as claimed in claim 1, wherein the spray liquor comprises 0.01 to 10 wt. % of the at least one pesticide, and 0.001 to 3 wt. % of the at least one polymer of component A), in each case based on the total weight of the spray liquor.

* * * * *